United States Patent [19]

Hyde

[11] Patent Number: 4,930,188
[45] Date of Patent: Jun. 5, 1990

[54] SPORTSMAN'S GAME AND FISH CLEANING STATION

[76] Inventor: Silas G. Hyde, Rte. 4, Box 162, Paragould, Ark. 72450

[21] Appl. No.: 411,897

[22] Filed: Sep. 25, 1989

[51] Int. Cl.$^5$ ............................................. A22B 1/00
[52] U.S. Cl. ................................. 17/44.3; 17/44.2; 17/70; 17/21; 248/316.5
[58] Field of Search ................ 17/44.2, 44.3, 44, 70, 17/21; 248/316.6, 316.5, 317, 322, 340, 231.5, 231.8, 225.31, 228, 229

[56] References Cited

U.S. PATENT DOCUMENTS

| | | | |
|---|---|---|---|
| 171,961 | 1/1876 | Smith | 17/44.3 |
| 508,711 | 11/1893 | Hilsher | 17/44.3 |
| 1,087,664 | 2/1914 | Keller | 248/316.5 |
| 1,248,843 | 12/1917 | Gay | 17/44.3 |
| 1,405,745 | 2/1922 | Winger | 17/44.3 |
| 3,165,779 | 1/1965 | Teetor et al. | 17/70 |
| 3,248,751 | 5/1966 | Wilborn | 17/70 |
| 3,274,639 | 9/1966 | Knauss | 17/44 |
| 3,908,231 | 9/1975 | Price et al. | 17/70 |
| 4,502,418 | 3/1985 | Runyan | 17/44 |
| 4,830,322 | 5/1989 | Gary | 248/316.5 |

Primary Examiner—Willis Little
Attorney, Agent, or Firm—Stephen D. Carver

[57] ABSTRACT

A game and fish cleaning station expedites the cleaning, skinning and/or processing of captured game animals. An elongated, aluminum support bar suspends game to be cleaned. It horizontally extends between a pair of support vertical posts, at a desired variable elevation. A clamping system forcibly sandwiches at least a portion of a game animal to be cleaned or skinned against the bar. The clamping system comprises a pair of rigid, grooves clamping plates which are pivotally coupled to the support bar by a special hinge structure. The clamping plates may be compressed against the support bar by tightening a suitable nut upon a threaded rod which penetrates a follower slot in the plates. When the clamping plates are compressed against the support bar, the grooves in the plates will register with similar grooves formed in the bar, and the feet of an animal will be frictionally captured. A cooperating cleaning table may be mounted below the support bar between the support posts. Suitable support retainers secured on the insides of the support posts restrain the table, which is firmly maintained in a generally planar, horizontal orientation by notches mated to the posts. Preferably the underside of the table is provided with suitable furniture leg brackets so that the table may be used independently of the posts. The cleaning table is also equipped with a skinning stud and a companion fillet clamp.

23 Claims, 3 Drawing Sheets

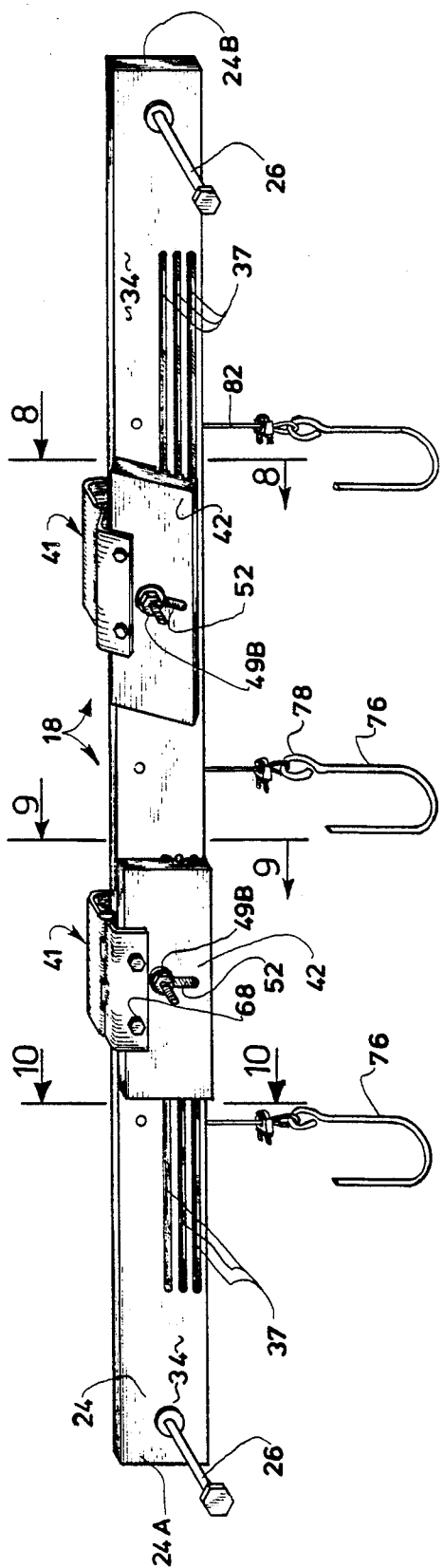
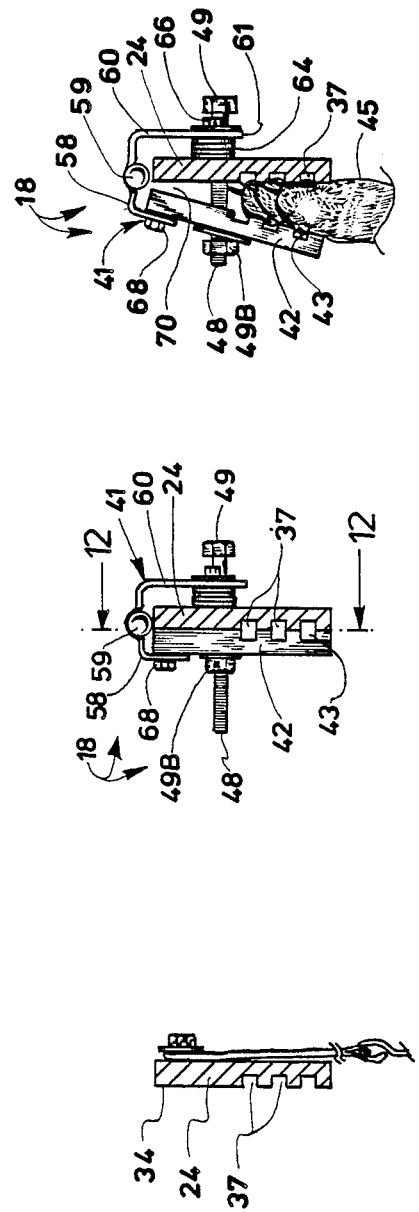
FIG. 7
FIG. 8
FIG. 9
FIG. 10

SPORTSMAN'S GAME AND FISH CLEANING STATION

BACKGROUND OF THE INVENTION

The present invention relates generally to apparatus for the cleaning or skinning of game animals or fish. More specifically, the present invention relates to a game cleaning system for reliably supporting game for dressing or cleaning. The invention is believed best classified in United States Class 119 subclass 96 or United States Class 17, subclass 44. The invention was disclosed and described in U.S. disclosure document No. 226052, filed in the U.S. Patent and Trademark Office on May 5, 1989.

Sportsman such as fisherman, fowl and game hunters must not only catch their prey, but must also promptly clean and prepare the animal for storage and subsequent consumption. For example, fish are often cleaned or filleted immediately prior to refrigeration or storage. Quarry such as deer should be promptly gutted, bled and skinned after harvesting. Numerous cleaning procedures have been perfected and a wide variety of implements have been proposed in the prior art for facilitating cleaning of particular types of game. For example, an animal or fish may be suspended from a game hook attached to a tree limb or similar object. Numerous clamps, stands and posts have been proposed.

However, most of such devices know to me are limited for use with either fish, game or fowl. A fish cleaning apparatus for example would not be suitable for dressing a wild game animal. Similarly, game suspending frames or hoists are typically unsuited for use with small fowl or fish. Also, with heavier game, known prior art devices are not solid enough to provide for reliable skinning and cutting. Hence it would seem desirable to provide apparatus which could be readily adapted for use with small or big game, including fish or fowl.

Prior art frames used to suspend wild game and the like are typically very cumbersome, heavy and expensive. Such devices typically employ hooks or wires for engaging the feet of a suspended animal. Typically the impaled feet of the animal will be torn away as the sportsman pulls against the animals body to gut it or remove its skin. Thus the operation is frequently interrupted. Moreover, such devices may not be used where it is desired to preserve the skins of fur-bearing animals. Hence it is desired to provide a device for supporting a game animal in position for cleaning without causing damage to the bones or skin. It is also desired to provide a frame which can be readily adapted to accommodate game animals of various sizes.

The most pertinent restrainer device known to me is disclosed by Runyan in U.S. Pat. No. 4,502,418, Issued Mar. 5, 1985. The restrainer device disclosed therein comprises a wooden block adapted to be suspended upon a pair of parallel chains. A pair of adjustable U-bolts associated with opposite ends of the board may be adjusted to frictionally clamp the feet of the game for support during cleaning. A plurality of mounting holes are provided whereby proper spacing of the bolts may be achieved for use with various sizes of game.

As will be appreciated by those skilled in the art, such devices may not be suitable for use with relatively large animals. Moreover such devices may be cumbersome to use, because it can be difficult to maintain stability while the game is being dressed. Moreover no suitable dressing surface or table for completion of the cutting operation is disclosed in U.S. Pat. No. 4,502,418.

The present invention attempts to address heretofore unresolved needs of the sportsman by providing suitable means for hanging and dressing wild game, as well as means for restraining and cleaning fish and fowl.

Once an animal is dressed and gutted, it must also be carved into easily manageable portions for transport and storage. It is very difficult to carve an animal while it is suspended. It is also unsatisfactory and inconvenient to butcher the animal on the ground. Thus it is desirable to provide a game cleaning apparatus which incorporates a suitable table or other flat working surface for carving.

SUMMARY OF THE INVENTION

The present invention comprises a game and fish cleaning station which greatly simplifies and expedites the cleaning, skinning and/or processing of captured game such as birds, mammals, fish and the like.

In the best mode the invention comprises an elongated, rigid support bar which is adapted to be extended horizontally above ground for supporting animals to be dressed. Preferably a pair of vertically oriented support posts are mounted within the ground in a convenient area, and the support bar is secured between the posts at a convenient elevation above ground.

The support bar comprises a clamping system for forcibly holding at least a portion of a game animal to be cleaned or skinned. In the best mode the clamping system comprises a pair of rigid clamping plates which are pivotally coupled to the support bar by a special hinge structure. The clamping plates may be compressed against the support bar by tightening a suitable nut upon a threaded rod which penetrates a follower slot in the plates. A trio of elongated, horizontally extending, parallel grooves are formed in the clamping plates. Similar grooves are defined in the face of the support bar, so that when the clamping plates are compressed against the bar, the various grooves will register, and the feet of an animal will be captured. When the feet of the animal to be dressed are thus sandwiched between the plates and the support bar, fleshy portions of the feet will be forced into the mutually abutting grooves, and the animal will be reliably suspended for cleaning.

The clamping bars are preferably pivotally secured to the support bar with a hinge establishing a pivot point outside of the region of contact established by the clamping plates and the support bar. This "wide opening" hinge design enables a portion of an animals foot, for example, to be readily inserted well within the clamping system without interference from the hinge. The support bar may also be provided with a plurality of removable hooks which readily grasp fish, for example, to be skinned or filleted.

Preferably the support bar is employed in conjunction with a cooperating table system. The table system comprises a generally rectangular cleaning table which includes suitable notches for fitting and mounting between the support posts previously described. Preferably the cleaning table is elevated to facilitate convenient cleaning for a fisherman seated within a conventional lawn chair. Suitable steel support retainers secured on the insides of the support posts restrain the table, which is firmly maintained in a generally planer, horizontal orientation when its notches are mated to the posts. Preferably the underside of the table is provided with suitable furniture brackets so that the table may be used independently of the posts. When the feet are installed, the table will be self supporting, the table may be employed within a boat or upon a suitable surface without the use of the support posts.

Preferably the cleaning table is equipped with a skinning stud and a companion fillet clamp. The skinning stud projects upwardly from the table surface, and it secures a fish whose gills are laid against it. Subsequent manipulation of the fish will lock the fishes jaws to the stud, so that cleaning may progress relatively easily. The fillet clamp grasps the tail of the fish for easy scaling or cleaning as desired by the fisherman.

Thus it is a broad object of the present invention to provide a reliable and handy game and fish cleaning station which may be used in a wide variety of circumstances.

A similar object of the present invention is to provide a flexible game cleaning station of the character described which is suitable for use with a wide variety of game, fish, and fowl.

Another basic object is to firmly and solidly grasp the animal to permit skinning and cutting.

Yet another object of the present invention is to provide a game and fish cleaning station of the character described which will readily and reliably elevate large game animals above the user for subsequent cleaning.

A still further object of the present invention is to provide a reliable clamping system for securely grasping the feet of an animal to be cleaned.

Yet another object of the present invention is to provide a versatile cleaning table which may be employed in conjunction with the preferred cleaning bar, and/or with or without support posts.

Yet another object of the present invention is to provide a cleaning station of the character described which may be readily erected from conventional posts and conveniently used outdoors with conventional lawn chairs.

A still further object of the present invention is to provide a clamping system for cleaning stations of the character described characterized by a wide spreading hinge system which facilitates the grasping of feet of different sizes and shapes.

Another object of the present invention is to provide a game and fish cleaning station of the nature described which combines means for suspending game animals with a horizontal work surface for facilitating butchering.

A still further object of the present invention is to provide a game and fish cleaning station which is conveniently transportable and readily deployable in a variety of desired locations.

Another object of the present invention is to provide a game and fish cleaning station of the character described which incorporates improved clamping means for securing the feet of a suspended animal or the like without damaging skin or fur.

Yet another object of the present invention is to provide a game and fish cleaning station adapted to support a plurality of fish or fowl to be cleaned.

A further object of the present invention is to provide a game and fish cleaning station which can be conveniently deployed for use by persons confined to a wheelchair or the like. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 7 is an enlarged, fragmentary, front perspective view illustrating the preferred support bar assembly;

FIG. 8 is an enlarged, fragmentary sectional view taken generally along line 8—8 of FIG. 7;

FIG. 9 is an enlarged, fragmentary sectional view taken generally along line 9—9 of FIG. 7;

FIG. 10 is an enlarged, fragmentary sectional view taken generally along lines 10—10 of FIG. 7;

DETAILED DESCRIPTION

Figure 1:
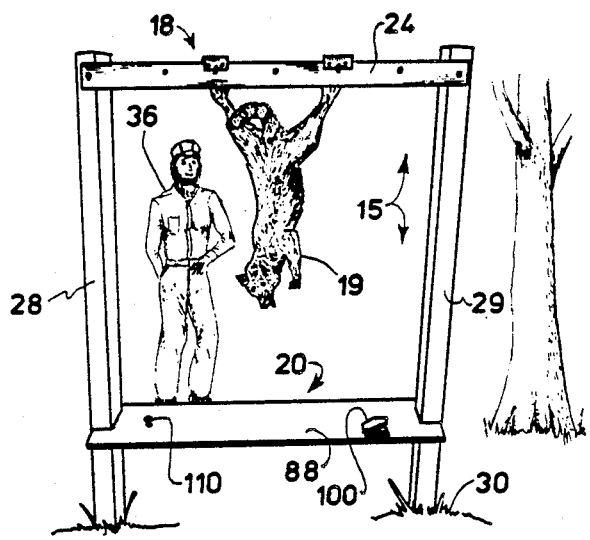
FIG. 1 is a pictorial view, illustrating the best mode of my SPORTSMAN'S GAME AND FISH CLEANING STATION in use supporting a typical game animal to be skinned or cleaned, with the cleaning table suspended between the support posts.
Figure 2:
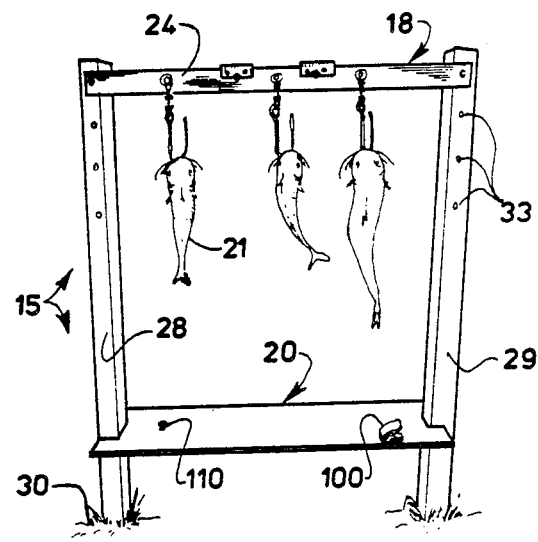
FIG. 2 is a pictorial view thereof, illustrating the optional fish cleaning hooks.

With initial reference now directed to FIGS. 1 and 2 of the appended drawings, a game and fish cleaning station constructed in accordance with the best mode of the present invention has been generally designated by the reference numeral 15. Cleaning station 15 preferably comprises an elevated support bar, generally designated by the reference numeral 18, and a cooperating cleaning table, generally designated by the reference numeral 20. In the best mode both the cleaning table 20 and the support bar 18 are mounted on vertically upright support posts 28 and 29. In FIG. 1 the captured game animal 19 is illustrated suspended from the support bar 18 for convenient cleaning by hunter 36. In FIG. 2 a plurality of fish 21 are suspended from bar 18 for cleaning. In either case the table 20 may be conveniently used in association with bar 18.

Table 20 will normally be positioned below support bar 18. However, as is apparent from FIGS. 3 and 4, table 20 may be employed separately. Alternatively, it will be appreciated that since the table 20 may be removed from the combination, as will hereinafter be described, the support bar 18 may be employed to dress or clean game without the table.

With primary reference now directed to FIGS. 1 and 7-12, the support bar 18 preferably comprises an elongated aluminum bar 24. In the best mode bar 24 is onehalf inch thick, three inches wide, and it is four feet long. Its' spaced apart ends 24A and 24B are both equipped with suitable apertures for receiving mounting cap screws 26 which secure the support 18 to the vertical posts 28, 29 (FIGS. 1 and 2). Posts 28 and 29 preferably comprise eight foot long treated four-by-fours. They are semi-permanently mounted in the ground 30. Each of the posts includes a plurality of mounting orifices 33 which facilitate the mounting of the support bar 24 at a desired elevation above ground 30.

Support bar 24 includes an outer face 34 which faces the hunter 36 (FIG. 1) or the viewer in (FIG. 7). Face 34 is preferably provided with a plurality of grooves 37. Grooves 37, preferably three in number, are ¼ inch deep in the best mode, and extend for approximately one foot. Support bar assembly 18 also comprises a pair of clamps, generally designated by the reference numeral 40, which are mounted to bar 24 with hinges 41. Each clamp comprises a rigid, generally rectangular clamping plate 42 which includes a plurality of spaced-apart, quarter-inch deep grooves 43 (FIGS. 8, 9). The clamping plates 42 may be compressed against the forward face 34 of the support bar 24 to suspend game by compressing foot 45 (FIG. 8) therebetween when the clamp is appropriately tightened. As best appreciated from FIG. 12, the clamping plates 42 each comprise an inner surface 42B in which the elongated, spaced-apart and parallel grooves 43 are defined. This surface 42B is compressed against support bar face 34 (FIG. 7) when the clamps are fastened. Clamping is achieved by tightening nut 49B. Head 49 or nut 49B may be manipulated with a conventional 9/16" wrench.

Figure 12:
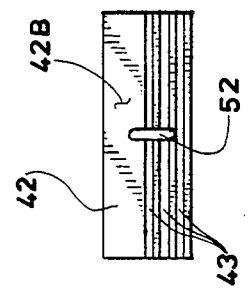

As seen in FIG. 7 and 12, an elongated vertical clearance slot 52 is defined in the center of the plate 42, and it intersects horizontal slots 43. Slot 52 is penetrated by bolt 8, and it enables the hinge 41 to readily function by moving the plate between the positions of FIGS. 8 and 9, for example. This clearance is provided by the "wide spreading" hinge design to be described.

Hinge 41 comprises a first generally L-shaped hinge element 58 which is pivoted at seam 59 to a second generally L-shaped element 60. The bottom 61 of hinge element 60 is spaced apart from the support bar 24 by a plurality of washers 64. It is secured to bar 24 by a suitable bolt 66. Hinge member 58 is secured to clamping plate 42 (FIGS. 8, 9) by a suitable bolt 68. The pivot point established along seam 59 is spaced-apart from and does not contact either the clamping plate 42 or the support bar 24. Thus it will be noticed that when the two are opened (FIG. 8), a small upper gap 70 is defined between the upper portions of clamping plate 42 and support bar 24. With this construction it is apparent that nut 49B need simply be loosened and the clamping plates 42 will be opened as desired. The hinge structure 41 readily facilitates opening and insertion of the leg of the animal 45. When nut 49B is thereafter tightened, fleshy portions of the feet will be compressed into the box-like slots 73 (FIG. 9) formed by alignment of plate slots 43 with support bar slots 37. The game will thus be reliably supported and its inadvertent removal or falling will be almost impossible.

Figure 11:
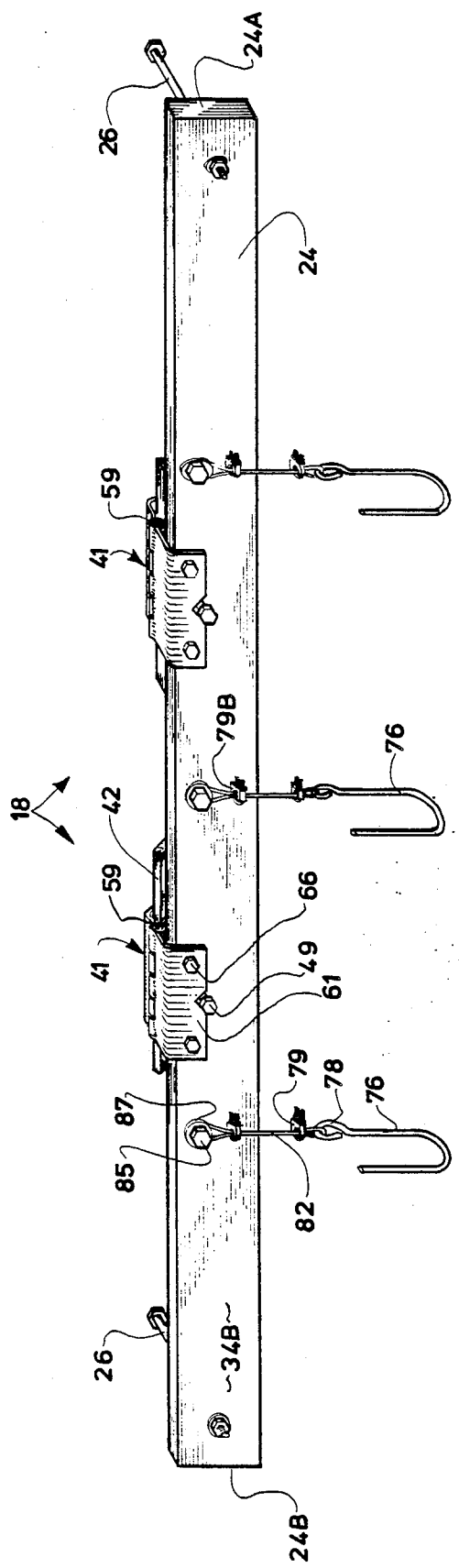
FIG. 11 is an enlarged, fragmentary, rear perspective view of the support bar of FIG. 7; and, FIG. 12 is an enlarged, fragmentary sectional view taken generally along line 12—12 of FIG. 9.

With reference now to FIGS. 7 and 11, the opposite surface 34B of the support bar 24 mounts a plurality of fish cleaning hooks 76. Hooks 76 are preferably formed from an appropriately bent 5/16" by 16" piece of metal. Eyelets 78 are secured via suitable clamps 79 to a supporting wire 82 which is secured to support bar surface 34B by suitable bolts 85 and washers 87 (FIG. 11). Support wires 82 preferably comprise a 12 inch piece of 3/16" of steel cable. Cable clamps 79 and 79B are conventional clamps.

With reference now to FIGS. 3 through 6, the preferred table 20 comprises a rigid, generally rectangular cleaning board 88 whose spaced apart ends 89 are equipped with suitable notches 90. As best viewed in FIG. 6, suitable steel support retainers 94 are secured to the inside faces of the support posts 28 and 29. Notches 90 may be fitted to the post, as in FIGS. 1 and 2. The table 88 will thus rest against the lower retainers 94 for support. The table is thus gravitationally supported upon retainers 94, but twisting or bending of the table is prevented by the close fit between notches 90 and post 28 or 29. In the best mode the cleaning board is ten inches wide and four feet long; notches 90 are preferably four inches wide and seven inches deep.

Preferably at least one fillet clamp 100 is secured upon the upper surface 88A of the cleaning table. This conventional clamp can be used to secure the tail 102 of a catfish 104, for example to be filleted. Its spring biased jaws compressively grasp the tail of the fish to be cleaned.

Figure 6:
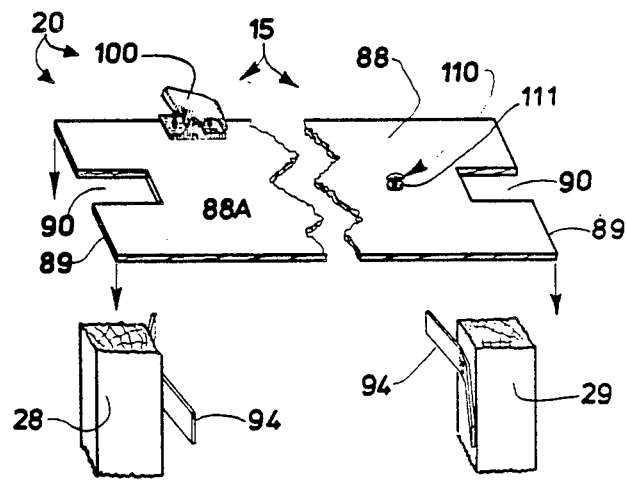
FIG. 6 is a enlarged, fragmentary, exploded view of the table structure.

The cleaning board also comprises at least one skinning stud, generally designated by the reference numeral 110 (FIG. 6). Skinning studs 110 are formed from a suitable ¼" by 2½ truss head stove bolt with a suitable nut and washer which is partially secured to the table 88. The shaft of the stove bolt is compressed by an upper nut 111 and a lower nut (not shown). This skinning stud 110 can lock within the gill of the fish 104 to be cleaned, and this facilitates positioning of the fish for convenient manipulation by the fisherman 36 upon the table 88A.

Figure 3:
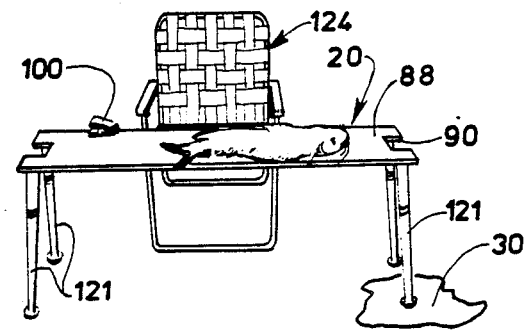
FIG. 3 is a fragmentary pictorial view illustrating the fish cleaning table supported by optional furniture legs with a fish restrained by the preferred skinning stud associated with the table.
Figure 4:
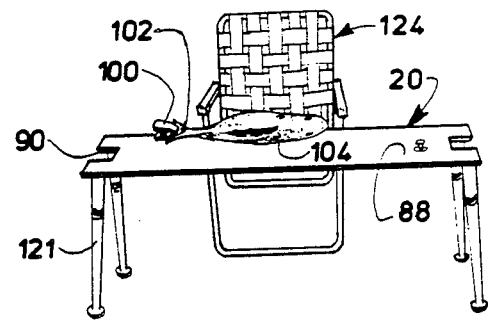
FIG. 4 is a fragmentary pictorial view similar to FIG. 3, showing the cleaning table and illustrating the preferred fillet clamp grasping the tail of a fish to be filleted.
Figure 5:
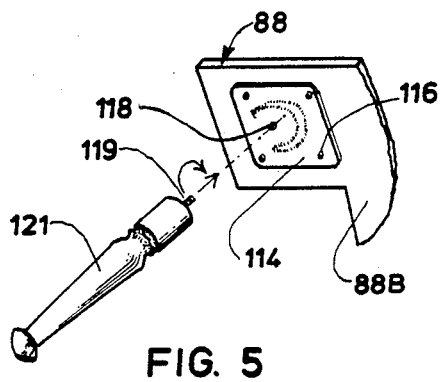
FIG. 5 is an enlarged, fragmentary isometric view of the bottom corner of the table.

The underside 88B (FIG. 5) of the cleaning board 88 is provided with a plurality of conventional furniture brackets 114. These brackets may be conventionally mounted with screws 116, and they include a threaded orifice 118 adapted to receive the threaded shaft 119 of a conventional furniture leg 121. When a plurality of legs 121 are suitable installed, board 88 may be disposed above the ground 30 (FIGS. 3 or 4) without posts 28,29. In any event it is preferred that support retainers 94 (FIG. 6) be suitably positioned such that the table is conveniently accessible to one seated in a conventional lawn chair 124 (FIGS. 3 and 4). Of course the length of conventional furniture legs 121 should be appropriate as well, preferably approximately twenty five to thirty inches.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A game and fish cleaning station comprising:
   elongated support bar means adapted to be generally horizontally disposed and supported above ground at a desired height for suspending a game animal to be cleaned;

clamping means associated with said support bar means for forcibly clamping at least a portion of said game animal against said support bar means to support the animal during subsequent cleaning, skinning, gutting or the like, said clamping means comprising:

clamping plate means adapted to be selectively compressed against said support bar means; and, hinge means for pivotally mounting said clamping plate means relative to said support bar means.

2. The station as defined in claim 1 wherein:

said support bar means comprises an outer face;

said clamping plate means comprise an inner face; and, said hinge means facilitates the mutual abutment of said clamping plate means inner face against support bar means outer face when said clamping means is actuated.

3. The station as defined in claim 2 wherein said inner face of said clamping plate means include a plurality of horizontally disposed generally parallel grooves.

4. The station as disclosed in claim 3 wherein the outer face of said support bar means comprises a plurality of generally horizontally extending grooves adapted to be substantially aligned with said grooves defined in said clamping plate means inner face when said clamping means is actuated, whereby to forcibly grasp anything sandwiched between said plate means and said bar means.

5. The station as defined in claim 4 wherein said hinge means establishes a pivot point between said clamping plate means and said support bar which is spaced apart from and out of contact with said support bar means outer face and said clamping plate means inner face.

6. The station as defined in claim 5 including a plurality of fish skinning hooks adapted to be suspended from said support bar.

7. The station as defined in claim 1 wherein:

said station comprises a pair of vertically upright, supporting posts; and, said support bar extends between said posts and is fastened at each of its ends to said posts.

8. The station as defined in claim 7 wherein said station comprises a generally rectangular and planar cleaning board extending between said posts beneath said support bar.

9. The station as defined in claim 8 wherein opposite ends of said cleaning board are provided with mounting notches to facilitate coupling of said board between said posts, and each of said posts comprises support retainers for supporting said board when said notches engage said posts.

10. The station as defined in claim 9 including skinning stud means secured to said board to facilitate the skinning, filleting, or cleaning of fish.

11. The station as defined in claim 9 including fillet clamp means secured to said board for facilitating the filleting or cleaning of a fish.

12. The station as defined in claim 11 including skinning stud means secured to said board to facilitate the skinning, filleting or cleaning of fish.

13. The station as defined in claim 9 wherein said board is fitted with furniture brackets on its opposite bottom ends on opposite sides of said notches for mounting furniture legs on the underside of said board to enable supporting of said board without said posts.

14. The station as defined in claim 7 wherein:

said support bar means comprises an outer face having a plurality of horizontally disposed generally parallel grooves;

said clamping plate means comprise an inner face comprising a plurality of generally horizontally extending grooves adapted to be substantially aligned with said grooves defined in said clamping plate means inner face when said clamping means is actuated whereby to forcibly grasp anything sandwiched between said plate means and said bar means; and, said hinge means facilitates the mutual abutment of said clamping plate means inner face against said support bar means outer face when said clamping means is actuated, said hinge means establishing a pivot point between said clamping plate means and said support bar which is spaced apart from and out of contact with said support bar means outer face and said clamping plate means inner face.

15. A game and fish cleaning station comprising:

a pair of vertically upright support posts:

elongated, grooved support bar means extending between said posts above ground at a desired height for suspending the game animal to be cleaned;

clamping means associated with said support bar means for forcibly clamping at least a portion of said game animal against said support bar means to support the animal during subsequent cleaning, skinning, gutting or the like, said clamping means comprising:

grooved clamping plate means adapted to be selectively compressed against said support bar means; and, hinge means for pivotally mounting said clamping plate means relative to said support bar means; and, a generally planar cleaning board extending between said posts adapted to be disposed generally parallel with and below said support bar.

16. The station as defined in claim 15 wherein said cleaning board comprises mounting notches to facilitate coupling of said board between said posts, and each of said posts comprises support retainers for supporting said board when said notches engage said posts.

17. The station as disclosed in claim 16 wherein said support bar means comprises a plurality of generally horizontally extending grooves adapted to be substantially aligned with similar grooves defined in said clamping plate means when said clamping means is actuated, whereby to forcibly grasp anything sandwiched between said plate means and said bar means.

18. The station as defined in claim 17 wherein said hinge means establishes a pivot point between said clamping plate means and said support bar which is spaced apart from and out of contact with said support bar means outer face and said clamping plate means inner face.

19. The station as defined in claim 18 including a plurality of fish skinning hooks adapted to be suspended from said support bar.

20. The station as defined in claim 18 including skinning stud means secured to said board to facilitate the skinning, filleting, or cleaning of fish.

21. The station as defined in claim 18 including fillet clamp means secured to said board for facilitating the filleting or cleaning of a fish.

22. The station as defined in claim 21 including skinning stud means secured to said board to facilitate the skinning, filleting or cleaning of fish.

23. The station as defined in claim 18 wherein said board is fitted with furniture brackets on its opposite bottom ends on opposite sides of said notches for mounting furniture legs on the underside of said board to enable supporting of said board with said posts.

* * * * *